3,271,315
USE OF HINDERED ESTERS OF CARBOXYLIC ACIDS AS RADIATION RESISTANT LUBRICANTS
Leo J. McCabe, Glassboro, N.J., assignor to Continental Oil Company, Ponca City, Okla., a corporation of Oklahoma
No Drawing. Filed Nov. 1, 1963, Ser. No. 320,829
The portion of the term of the patent subsequent to June 14, 1983, has been disclaimed
6 Claims. (Cl. 252—56)

This invention relates to a new use of hindered carboxylic acid esters as radiation resistant lubricants. More particularly, the invention relates to a process for lubricating moving parts which are exposed to radioactive emanations, and to the use of lubricating materials in an environment where such materials are exposed to nuclear and/or ionzing radiation. Yet more particularly, the present invention relates to processes in which ester-type materials derived from acids in which the carbon atom which is positioned in the alpha position relative to the carboxyl group is completely substituted with acylic alkyl groups.

In nuclear power plants now in use for generating electrical power and, eventually, in nuclear powered aero and space craft, there exists, or will exist, a necessity to lubricate moving parts in a high temperature-high radiation level environment. It has been predicted, for example, that in nuclear aero and space craft, lubricants will be required which will be stable when subjected to nuclear and ionizing radiation in dosages in the range of from about $10^8$ and $10^{10}$ Roentgen equivalent physicals (reps). Moreover, the temperatures to which lubricants employed in such craft may be subjected are expected, in many cases, to exceed 500° F. Even at the present time, the latter temperatures are frequently reached in turbojet and turboprop aircraft engines with the result that artificial, highly specialized engine lubricants have been sought which are stable at these elevated temperatures. Moreover, the lubricants employed in systems of the type described must be characterized in having relatively high hydrolytic stability as a result of the presence in such systems of deleterious amounts of water.

In an effort to satisfactorily meet the requirements of aircraft having severe thermal and hydrolytic environments of the type described, synthetic lubricants which perform adequately in these systems have been developed. One of the most satisfactory types of synthetic lubricants which has evolved from recent research are the materials described in co-pending United States application for Letters Patent Serial No. 210,198, filed July 16, 1962, now Patent No. 3,210,404 dated October 5, 1965, and assigned to the assignee of the present invention. The ester compounds which are described in the cited co-pending application are derived from organic carboxylic acids in which the carbon atom alpha or beta to the carboxyl group is completely substituted with acyclic alkyl groups. A preferred species of this group of ester compounds which is especially resistant to thermal and hydrolytic degradation are diesters which are derived from dicarboxylic acids in which the carbon atoms alpha to each of the carboxyl groups is completely substituted with acyclic alkyl groups, and from monohydroxy alcohols in which the beta carbon atoms of the alcohols are completely substituted with alkyl groups. Conventional monohydroxy alcohols in which the beta carbon atom of the alcohol is substituted by hydrogen atoms may also be used to form hydrolytically stable diesters of dicarboxylic acids of the type described. Complex esters in which more than one molecule of each of the aforementioned carboxylic acids and alcohols combine to form a complex ester molecule have also been found to possess superior hydrolytic and thermal stability.

The ester materials of the described molecular structure are termed hindered esters, this term being derived from the fact that the alkyl substituents of the alpha carbon in the acyl portion of the ester, and the alkyl substituent of the beta carbon in the alcohol portion of the ester hinder the reactivity and enhance the strength of the intermolecular bonds within the ester, and more particularly, the bonds adjacent the carbonyl group thereof. As pointed out in the hereinbefore cited patent application, the esters which are prepared from alcohols and acids, both of which are hindered in the manner described, possess both thermal and hydrolytic stability, and thus resist degradation or decomposition in the presence of water, acids and bases and under extreme temperature conditions. If, on the other hand, only the alcohol is hindered, the esters formed from such alcohols possess only thermal stability. Where the acid alone is hindered, the esters derived therefrom possess only hydrolytic stability.

I have now unexpectedly discovered that hindered esters of the type derived from a carboxylic acid in which the carbon atom which is adjacent the carboxyl group is completely substituted with acyclic alkyl groups are highly resistant to attack and decomposition by nuclear and/or ionizing radiation. Theoretically, it is to be expected that nuclear or ionizing radiation would randomly attack an organic molecule, and that the bonds within the molecule would be broken on a satistical basis according to the frequency of their occurrence, rather than preferentially at any particular bond. In accordance with this expected reaction to impingement by atomic radiation, it would be further supposed that, in the hindered esters of the type described, the nature of the substituents of alpha carbon atom of the acyl portion of the ester, and of the beta carbon atom of the alcohol portion of the ester, would make little difference in the radiation stability of these compounds. In actuality, however, it has been surprisingly determined that certain bonds of organic molecules are preferentially affected and that in esters of carboxylic acids, the reactive centers are the carboxyl group and linkages influenced by their proximity to the carboxyl group. Thus, conventional, un-hindered ester compounds are decomposed by radiation to the corresponding acids with the concurrent formation of ketones and olefinic compounds.

As indicated by the foregoing discussion, the present invention is based upon the discovery that hindered esters in which the alpha carbon of the acyl portion of the molecule has been fully substituted by alkyl groups unexpectedly display a relatively high resistance to decomposition when subjected to radiation by nuclear and ionizing radiation. Resistance to decomposition in a radioactive environment is further enhanced by also replacing hydrogen groups on the beta carbon of the alcohol portion of the ester molecule with alkyl groups. Although hindrance in only the alcohol portion of the ester molecule alone provides only slight improvement in radiation stability, where the alpha carbon of the acyl portion of the molecule is alone substituted by alkyl groups (that is, the beta carbon of the alcohol portion of the molecule is not so substituted), a more pronounced improvement in radiation stability is effected. The greatest improvement in radiation stability occurs when both of the critical carbon atoms are fully substituted by alkyl groups.

From the foregoing discussion, it will have become apparent that it is a major object of the present invention to provide a new use for compositions of matter which include as the sole or a major constituent thereof, an ester derived from an alcohol and a carboxylic acid in which the carbon atom which occupies the alpha position relative to the carboxyl group is fully substituted with alkyl groups.

More specifically, it is an object of the present invention to provide a process for effectively lubricating machine elements which are subjected to high levels of nuclear radiation during operation.

Yet another object of the invention is to provide organic ester compounds which are thermally and hydrolytically stable, and which are not readily decomposed when subjected to impingement by large dosages of nuclear radiation.

In addition to the objects and advantages of the invention to which reference has heretofore been made, other objects, advantages and meritorius features of the invention will become apparent from the following detailed description of the invention.

Before giving specific examples of the hindered, radiation stable esters of the invention, the processes by which they are produced and the effect of radiation on such compounds, it may be well at this time to describe the nature of the materials used in synthesizing the esters.

In order to set forth clearly the nature of the present invention, the term "ester" as used herein and in the claims refers to the product derived by reacting an organic carboxylic acid with an organic hydroxy compound.

The hindered dibasic acids which may be used in the preparation of one general type of ester used in the process of the present invention are characterized by the following formula:

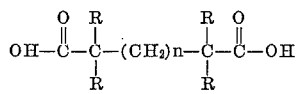

wherein R is an acyclic alkyl group containing from 1 to 4 carbon atoms and $n$ is an integer varying from 1 to 10.

Examples of suitable dibasic acids in which the carbon atom alpha to the carboxyl group is completely substituted with acyclic alkyl groups are the following:

Glutaric acids:
    2,2,4,4-tetraethyl* **
    2,4-dimethyl-2,4-diethyl*
    2,4-dimethyl-2,4-dipropyl*
    2,4-diethyl-2,4-dipropyl
    2,4-diethyl-2,4-dibutyl* **
    2,2,4,4-tetramethyl*
    2,2,4,4-tetrapropyl
    2,2,4,4-tetrabutyl Adipic acids:
    2,2,5,5-tetraethyl* **
    2,5-dimethyl-2,5-diethyl*
    2,5-dimethyl-2,5-dipropyl*
    2,5-diethyl-2,5-dipropyl
    2,5-diethyl-2,5-dibutyl* **
    2,2,5,5-tetramethyl*
    2,2,5,5-tetrapropyl
    2,2,5,5-tetrabutyl Pimelic acids:
    2,2,6,6-tetraethyl* **
    2,6-dimethyl-2,6-dipropyl*
    2,6-dimethyl-2,6-diethyl*
    2,6-diethyl-2,6-dipropyl
    2,6-diethyl-2,6-dibutyl* **
    2,2,6,6-tetramethyl*
    2,2,6,6-tetrapropyl
    2,2,6,6-tetrabutyl Suberic acids:
    2,2,7,7-tetraethyl* **
    2,7,dimethyl-2,7-diethyl*
    2,7,-dimethyl-2,7-dipropyl*
    2,7-diethyl-2,7-dipropyl
    2,7-diethyl-2,7-dibutyl* **
    2,2,7,7-tetramethyl*
    2,2,7,7-tetrapropyl
    2,2,7,7-tetrabutyl Azelaic acids:
    2,2,8,8-tetraethyl* **
    2,8-dimethyl-2,8-diethyl*
    2,8-dimethyl-2,8-dipropyl*
    2,8-diethyl-2,8-dipropyl
    2,8-diethyl-2,8-dibutyl* **
    2,2,8,8-tetramethyl
    2,2,8,8-tetrapropyl
    2,2,8,8-tetrabutyl
    2,2,8,8-tetraisopropyl
    2,2,8,8-tetratertiarybutyl Sebacic acids:
    2,2,9,9-tetraethyl* **
    2,9-dimethyl-2,9-diethyl*
    2,9-dimethyl-2,9-dipropyl*
    2,9-dimethyl-2,9-dipropyl
    2,9-diethyl-2,9-dibutyl* **
    2,2,9,9-tetramethyl*
    2,2,9,9-tetrapropyl
    2,2,9,9-tetrabutyl Of the suitable acids listed above, the ones indicated with an asterisk are preferred. Of the preferred acids, the ones indicated with a double asterisk are more preferred.

Examples of suitable conventional alcohols which may be reacted with the described dibasic acids to form radiation stable diesters are the following:

n-Butanol
    n-Hexanol*
    n-Octanol*
    n-Decanol*
    2-ethylhexanol*
    Isooctanol*
    n-Dodecanol
    n-Tridecanol
    n-Hexadecanol
    n-Octadecanol
    2-ethyl butanol
    Isodecanol Of the suitable alcohols tabulated above, the ones which are indicated with an asterisk are preferred.

Diesters are exceedingly difficult to synthesize from hindered dibasic acids of the type described because the hindrance afforded by the alkyl substituents of the alpha carbon of the acid severely impedes the esterification reaction with the alcohol. The method of synthesis which I have employed requires the initial preparation of the acid chloride of the hindered dibasic acid, and also the preparation of the sodium salt of the alcohol which is to be reacted with the acid chloride.

Diesters prepared from hindered, alpha-substituted dibasic acids and conventional alcohols have the following formula:

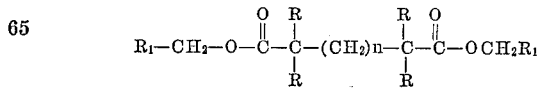

wherein R is an acyclic alkyl group containing from 1 to 4 carbon atoms, $R_1$ is an acyclic alkyl group containing from 1 to 10 carbon atoms, and $n$ is an integer varying from 1 to 10.

In addition to diesters prepared from the conventional (non-hindered) alcohols, diesters which I have found to demonstrate good radiation stability, and which are prepared from hindered dibasic acids of the type hereinbefore described and from hindered alcohols have the following formula:

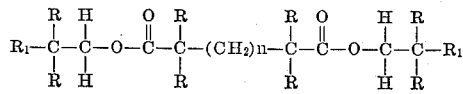

wherein R is an acyclic alkyl group containing from 1 to 4 carbon atoms, $R_1$ is an acyclic alkyl group containing from 2 to 10 carbon atoms, and $n$ is an integer varying from 1 to 10.

The hindered alcohols of the present invention have the formula:

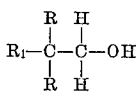

where R is an acyclic alkyl group containing from 1 to 4 carbon atoms, and $R_1$ is an acyclic alkyl group containing from 2 to 10 carbon atoms.

Examples of suitable hindered alcohols are the following:

2,2-dimethyl-1-pentanol*
2,2-diethyl-1-butanol*
2,2-dimethyl-1-hexanol*
2,2-dimethyl-1-butanol
2-methyl-2-ethyl-1-octanol
2,2,4-trimethyl-1-pentanol
2,2-dimethyl-1-octanol*
2,2-dimethyl-1-decanol*
2-methyl-2-propyl-1-pentanol
2-ethyl-2-propyl-1-hexanol
2-methyl-2-tertiary amyl-1-butanol
2-methyl-2-isopropyl-1-hexanol Of these alcohols, the ones indicated with an asterisk are more preferred.

Some of the hindered alcohols in which the beta carbon atoms is completely substituted with alkyl groups are available commercially. The others can be prepared in the laboratory. The preparation of 2,2 - dimethyl - 1-hexanol is shown below by way of example.

PREPARATION OF 2,2-DIMETHYL-1-HEXANOL (1) Intermediate (1) Sodium triethylmethoxide $$(C_2H_5)_3COH + NaNH_2 \xrightarrow{liq. NH_3} (C_2H_5)_3CONa$$

(2) Dimethylacetyl chloride $$(CH_3)_2CHC(O)OH + SOCl_2 \rightarrow (CH_3)_2CHCOCl$$

where C(O) is C=O.

(3) Triethylcarbinyl isobutyrate $$(C_2H_5)_3CONa + (CH_3)_2CHCOCl \rightarrow$$
$$(CH_3)_2CHC(O)OC(C_2H_5)_3$$

(2) 2,2-dimethyl-1-hexanol (1) $(CH_3)_2CHC(O)OC(C_2H_5)_3 NaNH_2 \xrightarrow{liq. NH_3}$

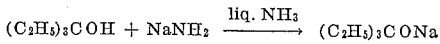

(2) 

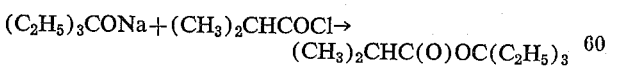

(3) 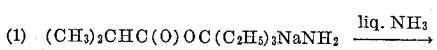

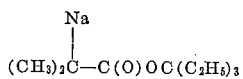

As previously indicated, the esters of the invention may also be derived from hindered monobasic acids. These compounds have the formula:

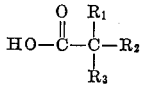

wherein $R_1$, $R_2$ and $R_3$ are acyclic alkyl groups containing from 1 to 18 carbon atoms. Examples of suitable hindered monobasic acids are the following:

2,2-dimethyl-1-butanoic acid
2,2-dimethyl-1-pentanoic acid*
2,2-dimethyl-1-hexanoic acid*
2,2-dimethyl-1-heptanoic acid
2,2-dimethyl-1-octanoic acid*
2,2-dimethyl-1-nonanoic acid
2,2-dimethyl-1-decanoic acid*
2,2-dimethyl-1-hendecanoic acid
2,2-dimethyl-1-dodecanoic acid*
2,2-dimethyl-1-tetradecanoic acid*
2,2-dimethyl-1-hexadecanoic acid*
2,2-dimethyl-1-octadecanoic acid*
2,2-dimethyl-1-eicosanoic acid
2-methyl-2-ethyl-1-$C_4$–$C_{20}$-monocarboxylic acid
2-methyl-2-propyl-1-$C_5$–$C_{20}$-monocarboxylic acid
2-methyl-2-amyl-1-$C_7$–$C_{20}$-monocarboxylic acid
2,2-diethyl-1-$C_4$–$C_{20}$-monocarboxylic acid
2-ethyl-2-propyl-1-$C_5$–$C_{20}$-monocarboxylic acid
2-ethyl-2-butyl-1-$C_6$–$C_{20}$-monocarboxylic acid
2-ethyl-2-amyl-1-$C_7$–$C_{20}$-monocarboxylic acid
2,2-dipropyl-1-$C_5$–$C_{20}$-monocarboxylic acid
2-propyl-2-butyl-1-$C_6$–$C_{20}$-monocarboxylic acid
2-propyl-2-amyl-1-$C_7$–$C_{20}$-monocarboxylic acid
2,2-dibutyl-1-$C_6$–$C_{20}$-monocarboxylic acid
2,2-diamyl-1-$C_7$–$C_{20}$-monocarboxylic acid
2-butyl-2-amyl-1-$C_7$–$C_{20}$-monocarboxylic acid
2-hexyl-2-methyl-decanoic acid Of the above suitable hindered monobasic acids, the ones which are indicated with an asterisk are preferred.

In addition to monohydroxy alcohols, polyhydroxy alcohols may also be reacted with the dibasic and monobasic carboxylic acids described above to produce esters suitable for use in the process of the present invention. The hindered polyhydroxy alcohols which are suitable for use have the following formula:

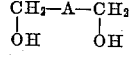

where A has a formula selected from the group consisting of:

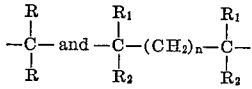

wherein R, $R_1$ and $R_2$ are acyclic alkyl groups containing from 1 to 4 carbon atoms, and $n$ is an integer varying from 1 to 10.

Examples of suitable hindered polyhydroxy alcohols are the following:
Glycols:
    1,3-propanediols—
        2,2-dimethyl*
        2,2-diethyl*
        2,2-dipropyl
        2,2-dibutyl
        2-methyl-2-ethyl*
        2-methyl-2-propyl*

2-methyl-2-butyl*
2-ethyl-2-propyl
2-ethyl-2-butyl
1,6-hexanediols—
  2,2,5,5-tetramethyl*
  2,6-dimethyl-2,6-diethyl*
  2,6-dimethyl-2,6-dipropyl
  2,6-dimethyl-2,6-dibutyl
  2,6-diethyl-2,6-dipropyl*
  2,2,5,5-tetraethyl*
  2,2,5,5-tetrabutyl
  2,5,5-trimethyl-2-propyl-3-ethyl
  2,2,5,5-tetramethyl-3,4-diethyl
1,7-heptanediols—
  2,4,6-trimethyl-2,6-dipropyl
  2,2,4,6,6-pentamethyl-3-ethyl
1,8-octanediols—
  2,7,7-trimethyl-2-propyl
  2,2,4,5,7,7-hexamethyl
  2,2,7,7-tetramethyl-3-ethyl
  2,2,4,7,7-pentamethyl
1,10-decanediols—2,2,9,9-tetramethyl*

Of the above suitable hindered polyhydroxy alcohols, the ones which are indicated with an asterisk are preferred.

Esters which are prepared from the described hindered monobasic acids and hindered polyhydroxy alcohols have, as indicated in the cited co-pending application, improved hydrolytic and thermal stability. We have now determined that these materials are further characterized in having a high degree of stability when subjected to impingement by nuclear and ionizing radiation. These materials have the following generic formula:

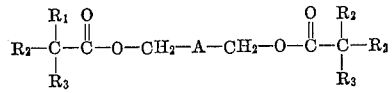

wherein $R_1$, $R_2$ and $R_3$ are acyclic alkyl groups containing from 1 to 20 carbon atoms and where A is selected from the group consisting of:

and

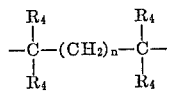

wherein $R_4$ is an acyclic alkyl group containing from 1 to 4 carbon atoms, and $n$ is an integer varying from 1 to 10.

The esters which have been discussed to this point may be properly termed simple esters in that they are formed by the reaction between either a single molecule of carboxylic acid or a single molecule of alcohol with two molecules of the other material. In addition to such simple esters, complex esters can be prepared from the hereinbefore described hindered conventional alcohols, hindered dibasic acids, and hindered polyhydroxy alcohols of the invention. We have determined that these complex esters also possess improved radiation stability. The complex ester compounds can be represented diagrammatically as follows:

(A)            A—B—C—B—A and (B)            D—C—B—C—D where A equals hindered monohydroxy alcohol, B equals hindered dibasic acid, C equals hindered polyhydroxy alcohol and D equals hindered monobasic acid.

The process for preparing the hindered alpha-substituted dibasic acids used in the invention can be described as comprising the following steps:

(a) Preparation of 2,2-dialkylacetyl halide,
(b) Preparation of alkali metal salt of trialkylcarbinol,
(c) Reaction of 2,2-dialkylacetyl halide with the alkali metal salt of trialkylcarbinol to form trialkylcarbinyl-2,2-dialkylacetate in presence of liquid ammonia,
(d) Preparation of sodio salt of trialkylcarbinyl-2,2-dialkylacetate by reaction with metallic sodium in liquid ammonia,
(e) Reaction of sodio salt of trialkylcarbinyl-2,2-dialkylacetate with an alkylene dihalide,
(f) Hydrolysis of product of step (e) to produce the 2,2,8,8-tetraalkyl substituted acid.

As an example of the preparation of one of the alpha-substituted dibasic acids, the preparation of tetraethylazelaic acid is as follows:

(a) *Sythesis of the intermediates*

(1) Preparation of diethylacetyl chloride:

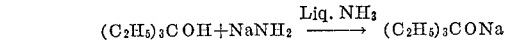

(2) Preparation of sodium triethylmethoxide:

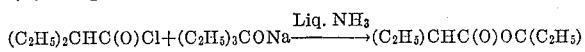

(3) Preparation of triethylcarbinyl 2-ethylbutyrate:

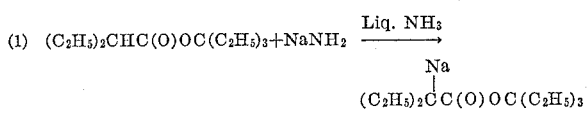

(b) *Synthesis of di(triethylcarbinyl) 2,2,8,8-tetraethylazelate*

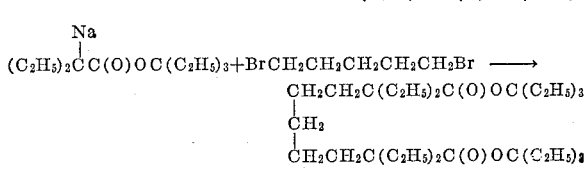

(c) *Preparation of 2,2,8,8-tetraethylazelaic acid*

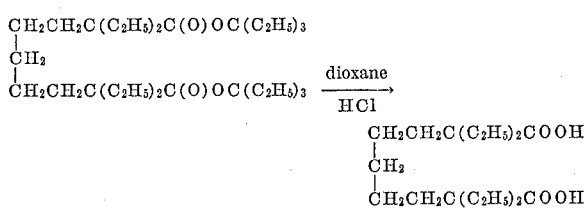

Although the specific applications of the process of this invention which have been heretofore mentioned have contemplated the use of the described hindered esters in certain environments of high radiation, and particularly, nuclear submarines and aircraft, it will also be apparent that the hindered esters of the invention may also be employed in other applications where a fluid having a good thermal and hydrolytic stability, the good viscosity characteristics and other properties attributable to diesters of this type, is subjected to impingement by atomic radiations of the type contemplated. Thus, the esters might be used in machinery requiring wide temperature range greases, as high temperature heat transfer fluids, in hydraulic fluids and in lubricants for the protection of precision instrument bearings where these uses were carried on in a high radiation environment.

Conventional diesters were used as standards for comparison with the hindered esters of this invention in evaluating the radiation stability properties of the hindered esters. Diisooctyl azelate and di-2-ethylhexyl sebacate are commercially available diesters which were used in the comparison tests. Di-n-octyl azelate was prepared from commercially available materials and its preparation will be described in the examples hereinafter.

In order to disclose the nature of the present invention more clearly, the following examples are provided to illustrate the manner in which the radiation stable esters are prepared, and the results obtained upon subjecting these esters to atomic radiation. It is to be understood that the invention is not to be limited to the specific conditions or details set forth in these examples except insofar as such limitations are specified in the appended claims.

*Example I.—Preparation of di-n-octyl azelate*

| Materials | Moles | Grams |
|---|---|---|
| Azelaic acid | .1 | 188.2 |
| 1-octanol | 2.5 | 325.0 |
| Toluenesulfonic acid | | 2.0 |
| Benzene | | [1] 150 |

[1] Cubic centimeter.

*Apparatus.*—One-liter, three-necked, round-bottomed flask; Trubore stirrer, thermometer, Barrett water trap; reflux condenser; heating mantle; separatory funnel (two liters).

*Procedure.*—188.2 grams of azelaic acid, 325.0 grams of 1-octanol, 2.0 grams of toluenesulfonic acid, and 150 cc. of benzene were charged to the reaction flask. Heat was applied and stirring commenced. The reaction mixture was refluxed at 95° C. and reflux was continued for 8 hours, at which time the reflux temperature had risen to 110° C. During the period of refluxing, 36 ml. of water was removed and collected in a water trap. The reaction mixture was transferred following refluxing to a separatory funnel and washed with two 250 ml. portions of 5 per cent aqueous sodium carbonate solution. It was then washed with five 250 ml. portions of tap water until the pH (by Hydrion paper) was 7. The crude diester was dried over anhydrous magnesium sulfate and then filtered through a one-inch cake of Hyflo filter aid. The filter aid was washed with 100 ml. of benzene and the benzene wash then was added to the product layer. The crude mixture (653 grams) was charged to a simple vacuum distillation setup. Using a water aspirator, benzene solvent was removed. Using a vacuum pump, a forecut which included excess alcohol was removed at 0.65 mm. Hg up to a vapor temperature of 187° C. At 0.07 mm. Hg, 364.0 grams of the diester (di-n-octyl azelate) was collected. A cut distilling between 202° C. and 235° C. at 0.17 mm. Hg weighed 18.2 grams. The bottoms weighed 7.5 grams. The diester cut was percolated through 104 grams of alumina. The filtrate had an acid number of 1.2 and a saponification number of 269. The acid number was further reduced to 0.02 by percolation through a basic ion exchange resin.

*Example II.—Preparation of di-2,2-dimethylhexyl azelate*

| Materials | Moles | Grams |
|---|---|---|
| 2,2,-dimethyl-1-hexanol | 1.11 | 141.8 |
| Azelaic acid | 0.56 | 104.5 |
| Benzene (solvent and water entrainer) | | [1] 205 |
| P-toluenesulfonic acid (catalyst) | | 2.0 |
| Ether (wash solvent) | | [1] 650 |

[1] Cubic centimeter.

*Apparatus.*—Two-liter, three-necked, round-bottom flask; Trubore stirrer, thermometer; Barrett water trap; water-cooled reflux condenser.

*Procedure.*—To the reaction flask were charged 141.8 grams of 2,2-dimethyl-1-hexanol, 104.5 grams of azelaic acid, 250 cc. of benzene, and 2 grams of p-toluenesulfonic acid. This mixture was heated at reflux with stirring for 8 hours, during which time 20.5 cc. of water was collected in the Barrett trap. In an additional 8 hours of heating at reflux with stirring, no additional water was collected. The reaction mixture was transferred to a separatory funnel and washed with two 100 ml. portions of sodium carbonate solution which emulsified. After standing overnight, the emulsion separated when 400 ml. of ether was added. This ethereal layer was then washed with two 100 ml. portions of water, dried over calcium sulfate, and filtered through a three-inch cake (90 grams) of alumina. The alumina was washed with 150 ml. of ether. The ethereal filtrate and the ether wash of the alumina were combined and stripped of benzene and ether up to 100° C. on a water aspirator. At 0.14 mm. Hg using a vacuum fractionation setup, 163.4 grams of di-2,2-dimethylhexyl azelate was separated between 176° C. and 191° C. vapor temperature. A forecut (10 grams) and the still bottoms (14 grams) were also obtained. The yield of the diester based on the alcohol charged to the reaction flask is 72.5 percent. The acid number of the distilled diester was 0.76. The acid number was reduced to 0.04 by percolation through a basic ion exchange resin.

*Example III.—Preparation of 2,2,8,8-tetraethylazelaic acid*

A. PREPARATION OF 2-ETHYLBUTYRYL CHLORIDE

| Materials | Mole Weight | Moles | Quantity, g. |
|---|---|---|---|
| 2-ethylbutyric acid | 116.16 | 15 | 1,743 |
| Thionyl chloride, Eastman grade | 118.98 | 16.8 | 2,000 |

*Procedure.*—To 2000 grams of thionyl chloride maintained at 45° C., 1743 grams of 2-ethylbutyric acid was added dropwise. The mixture was then heated to 75° C. for 4 hours to drive out the remaining sulfur dioxide. The product (1685 grams, 83.5 percent yield) was distilled at 135° C. to 137° C. through a six-inch vacuum jacketed column packed with glass helices.

B. PREPARATION OF TRIETHYLCARBINYL 2-ETHYL-BUTYRATE

| Materials | Mole Weight | Moles | Quantity, g. |
|---|---|---|---|
| Ferric nitrate | | | 1 |
| Ammonia, anhydrous | | | [1] 2,000 |
| Sodium, purified lump | 22.997 | 6.1 | 140 |
| Triethylcarbinol, Eastman grade | 116. | 6. | 696 |
| 2-ethylbutyryl chloride | 134.61 | 6. | 807 |
| Ether, anhydrous reagent | | | [1] 1,500 |

[1] Cubic centimeter.

*Procedure.*—Sodium amide was prepared from 140 grams of sodium and 2 liters of liquid ammonia, using ferric nitrate as catalyst. Triethylcarbinol (969 grams) in 300 cc. of dry ether was slowly added to the reaction mixture. The ammonia was allowed to evaporate, and the mixture was refluxed in a stream of nitrogen for 12 hours. Approximately one liter of dry ether was added during this time.

A solution of 807 grams of 2-ethylbutyryl chloride in 200 cc. of ether was added dropwise to the reaction mixture. The mixture was then stirred for 1 hour and heated under reflux for another hour. Water was added to dissolve the solids. The ethereal solution was washed with 10 percent sodium hydroxide, washed with water until neutral, and dried over calcium sulfate. Fractional distillation of the crude mixture yielded 1067 grams (83.5 percent) of triethylcarbinyl 2-ethylbutyrate (B.P. 102–105° C. at 10 mm.).

C. PREPARATION OF DI-(TRIETHYLCARBINYL)-2,2,8,8 TETRAETHYLAZELATE

| Materials | Mole Weight | Moles | Quantity, g. |
|---|---|---|---|
| Ferric nitrate | | | 1 |
| Ammonia, anhydrous | | | [1] 2,000 |
| Triethylcarbinyl 2-ethylbutyrate | 214. | 5. | 1,067 |
| 1,5-dibromopentane, Eastman grade | 229.97 | 2.5 | 575 |
| Sodium, purified lump | 22.997 | 5. | 155 |
| Ether, anhydrous reagent | | | [1] 600 |

[1] Cubic centimeter.

*Procedure.*—Sodium amide was prepared from 115 grams of sodium and 2 liters of liquid ammonia. Triethylcarbinyl 2-ethylbutyrate (1067 grams) was added dropwise, and the mixture was stirred for 1.5 hours. A solution of 575 grams of dibromopentane in 200 ml. of ether was added dropwise, and stirring was continued for 1.5 hours. More ether (400 ml.) was added, and the ammonia was allowed to evaporate. After refluxing the solution for 1 hour, water was added to dissolve the solids present. The ethereal solution was washed with water until neutral, dried over calcium sulfate, and reduced to small volume under vacuum. The crude residue weighing 1002 grams was hydrolyzed without further purification.

D. HYDROLYSIS OF DI-(TRIETHYLCARBINYL)-2,2,8,8,-TETRAAZELATE

| Materials | Mole Weight | Moles | Quantity, g. |
|---|---|---|---|
| Di (triethylcarbinyl) 2,2,8,8-tetraethylazelate | 496 | 2.02 | 1,002 |
| Hydrochloric acid, concentrated reagent | 36.5 | 5.35 | 1 450 |
| Dioxane, commercial | | | 1 500 |

[1] Cubic centimeter.

*Procedure.*—Concentrated hydrochloric acid (450 cc.) was slowly added to a refluxing solution of the crude di-(triethylcarbinyl)-2,2,8,8-tetraethylazelate in 500 cc. of dioxane. After refluxing for 2 hours, 945 cc. of azeotropic distillate had been collected. Water was added to precipitate the crude acid, which was collected on a filter, recrystallized twice from 90:10 ethanol-methanol and water, and once from acetone-naphtha. The purified acid (M.P. 142–143.5° C.) obtained weighed 461.5 grams (61.5 percent, based on triethylcarbinyl 2-ethylbutyrate). The acid number found for the azelaic acid was 381 as compared with a calculated value of 374.

*Example IV.*—*Preparation of di-2,2-dimethylamyl-2,2,8,8-tetraethyl azelate*

A. PREPARATION OF 2,2,8,8-TETRAETHYLAZELAOYL CHLORIDE

| Materials | Moles | Grams |
|---|---|---|
| 2,2,8,8-Tetraethylazelaic acid [1] | 0.513 | 154 |
| Thionyl chloride | 1.26 | 150 |
| Benzene (solvent) | | 2 500 |

[1] Prepared in accordance with synthesis steps outlined in Example III.
[2] Cubic centimeter.

*Apparatus.*—Two-liter, three-necked flask; Trubore stirrer; reflux condenser; thermometer.

*Procedure.*—To the dry two-liter flask were charged 150 grams of thionyl chloride along with 154 grams of 2,2,8,8-tetraethylazelaic acid in 500 ml. of benzene. Stirring was commenced, and the mixture was heated at 78° C. until hydrogen chloride gas evolution ceased (12 hours). The crude mixture was stripped of excess thionyl chloride and benzene at atmospheric pressure up to a pot temperature of 125° C. On house vacuum at maximum pot temperature of 118° C., remaining traces of the light ends were removed. The acyl halide bottoms weighed 170 grams (theoretical 174 grams).

B. PREPARATION OF DI-2,2-DIMETHYLAMYL-2,2,8,8-TETRAETHYL AZELATE

| Materials | Moles | Grams |
|---|---|---|
| Ferric nitrate (catalyst for amide preparation | | 1.0 |
| Ammonia (solvent and reactant) | | 1 1,000 |
| 2,2-Dimethyl-1-pentanol | | 116 |
| Sodium | .1 | 23 |
| Ether (solvent) | | 1 1,500 |
| 2,2,8,8-Tetraethylazelaoyl chloride | 0.504 | 170 |

[1] Cubic centimeter.

*Apparatus.*—Two-liter, three-necked flask; Trubore stirrer; Dry Ice-cooled condenser; bubble counter; drying tube; dropping funnel.

*Procedure.*—To the flask were charged 1000 ml. of ammonia after the flask had been flushed with nitrogen. 0.5 grams of sodium metal was then added to the flask. After the solution turned blue, the liquid was blown with dry air until the color was discharged. One gram of ferric nitrate was added to the flask. Stirring was commenced, and the remaining 22.5 grams of sodium was added in small portions over a period of one hour. The temperature of the reaction flask was held at −35° C. Ten minutes after the addition of the sodium was completed, the blue color was discharged. To this mixture was added dropwise 116 grams of 2,2-dimethylpentanol diluted with 300 ml. of dry ether. After the final addition of 2,2-dimethylpenanol, ammonia was allowed to evaporate overnight. Nitrogen was blown through the reaction mixture, which was heated on a steam bath for 6 hours. 200 ml. of ether was added followed by 170 grams of 2,2,8,8-tetraethylazelaoyl chloride in 300 ml. of dry ether at such a rate as to maintain constant reflux and control the reaction. Poststirring was continued for 3 hours at full reflux. Ice water (750 ml.) was added cautiously over one-half hour. The mixture was filtered to remove flocculent material and tranferred to a separatory funnel in which two layers formed. The water layer was removed and washed with 200 ml. of ether and the ether wash combined with the ether layer. The ether layer was washed with water until the resulting water wash was neutral to Hydrion paper. The ether layer was dried overnight over calcium sulfate, filtered through alumina, and stripped of ether up to 60° C. at atmospheric pressure. The crude diester was charged to a vacuum distillation setup and stripped up to 192° C. at 0.25 mm. Hg pressure. The maximum vapor temperature was 23° C. The product diester (bottoms) was diluted 50 percent by volume with pentane and percolated through a 12-inch column of basic ion exchange resin (IR–45). The column was washed with pentane and the washings combined with the product-containing layer. Pentane was removed up to 115° C. at 0.3 mm. Hg pressure. The product weighed 198.5 grams. The acid number of the diester was 0.64.

*Example V.*—*Preparation of 2-ethyl-2-butyl-1,3-propanediol-di-(2,2-dimethyl valerate)*

The preparation of the valeric acid used was by a procedure similar to that used in Example III for the preparation for the tetraethylazelaic acid with the exception that a monobromide instead of a dibromide was used.

The 2-ethyl-2-butyl-1,3-propanediol used was commercially available.

The method of esterification employed was similar to that described in Example IV.

*Example VI.*—*Preparation of 2,2,5,5-tetramethyl-1,6-hexanediol-di-(2,2-dimethyl valerate)*

The preparation of the 2,2-dimethylvaleric acid employed a procedure similar to that used in Example III, with the exception that a monobromide, instead of a dibromide, was used.

The 2,2,5,5-tetramethyl-1,6-hexanediol was prepared as follows:

In a 3-liter, 3-necked flask fitted with a Trubore stirrer, dropping funnel, and reflex condenser with drying tube, 36 grams (0.95 mole, metal hydrides) of lithium aluminum hydride were slurried in 600 ml. of dry tetrahydrofuran. While the slurry was rapidly stirred, 126.2 grams (0.625 mol) $\alpha,\alpha,\alpha',\alpha'$-tetramethyladipic acid dissolved in 1,150 ml. of dry tetrahydrofuran were added from the dropping funnel at a rate which maintained gentle reflux (90 minutes).

The reaction mixture was refluxed for 30 minutes, and then 1 liter of tetrahydrofuran was distilled from the flask with stirring. The flask was cooled in an ice bath; then 300 ml. of water were added, very carefully at first, followed by 150 ml. of concentrated sulfuric acid in 1 liter of water, and finally, by 600 ml. of ether.

In a separatory funnel, the water phase was drawn off and discarded. The ether phase was extracted with 250 ml. of 10 percent sodium bicarbonate. Acidification of the bicarbonate extract gave 31.5 grams of unreacted acid. This was immediately reduced by the procedure just described.

The ether solutions from both reductions were combined, dried with sodium sulfate and calcium chloride, and stripped of ether. The product, a tan solid, was distilled in a Koelsch flask at 0.5 mm. of Hg. The yield of white, waxy material, M.P. 76° C.–79° C., was 76.8 grams (0.441 mole, 7 percent).

The ethyl ester of $\alpha,\alpha,\alpha',\alpha'$-tetramethyladipic acid was also made and reduced to the diol. A solution of 35 grams (0.173 mole) of the crude acid, 300 ml. of absolute ethanol, and 5 ml. of concentrated sulfuric acid was refluxed for 14 hours and poured into a separatory funnel with ether and water. After extraction with 10 percent sodium bicarbonate and drying, the ether solution was stripped of ether. Distillation through a short Vigreaux column gave 28.5 grams (0.111 mole, 64 percent) of colorless liquid, B.P. 92° C.–94° C. at 2 mm.

Using a 1-liter, 3-necked flask equipped with a Trubore stirrer, reflux condenser, and dropping funnel, 28.5 grams (0.111 mole) of the ester were added at reflux rate to a slurry of 4.5 grams (0.119 mole, metal hydrides) of lithium aluminum hydride in 150 ml. of ether. The mixture was refluxed for 30 minutes after the addition. About 40 ml. of water were added carefully to the cooled flask, followed by 22 ml. of concentrated sulfuric acid in 200 ml. of water. The resulting ether solution of product was worked up just as in the acid reduction. The yield of diol (undistilled) was 17.6 grams (0.101 mole, 91 percent).

The diol produced in the manner described was reacted with 2,2-dimethylvaleric acid by a procedure similar to that used in Example IV.

*Example VII.—Preparation of trimethyl propane ester of 2,2-dimethylvaleric acid*

Commercially available trimethylol propane was reacted with 2,2-dimethylvaleric acid by a procedure similar to that used in Example IV.

TESTING PROCEDURES AND TEST RESULTS IN EVALUATING RADIATION STABILITY

Reported work on the stability of conventional diesters to atomic radiation indicates that the physical properties affected most are acid number, flash point and viscosity. Most of the literature concerned with the effect of radiation on the stability of synthetic lubricants describes the increased acidity resulting from decomposition under nuclear radiation in terms of the change in acid number. This method measures the acidity increase per gram of material, but fails to relate this value to the combining weight of the synthetic ester so as to give an easily understood conception of the portion of the total molecule which is hydrolyzed through the radiation decomposition mechanism to produce the acid. In the tests of the esters which I have conducted, I have determined the change in acid number occurring in the system under high dosages of radiation, and have also calculated the percent of the ester hydrolyzed as a result of such radiation. Thus, the results obtained illustrate quantitatively one means of ester decomposition occurring when the ester is subjected to impingement by nuclear and ionic radiation.

In testing for radiation stability, the conventional and hindered esters prepared as hereinbefore described, the ester samples were poured into vented glass bottles which had been preirradiated with gamma rays in an amount equivalent to the dosage to which the sample was to be subjected so as to avoid errors arising from the radiation absorptive effect of glass. The bottles were then placed in specially constructed aluminum containers and the samples therein were irradiated with gamma rays from a spent fuel element source. The aluminum sample containers were equipped with valves to allow the escape of the gases formed during irradiation. No attempt was made to exclude air from the system. The radiation dosage was measured by a specially constructed ionization chamber which was calibrated by the ceric-cerous sulfate method. The dose rate to which the samples were subjected was about $10^5$ reps/hour.

In addition to the tests of radiation stability which were carried out by subjecting the samples to impingement by radiation in the manner described, then measuring the change in acid number and calculating the percent of the ester hydrolyzed, additional physical tests of the samples were conducted to determine other properties of interest in evaluating the esters as synthetic lubricants. These tests were conducted using standard ASTM procedures. The results of all of the tests which were conducted are set forth in Table I.

TABLE I (PART 1).—PHYSICAL PROPERTIES OF ESTERS

| Ex. No. | Diester | Viscosities ||| Viscosity Index | ASTM Slope | Density at 25° C. | Refractive Index at 25° C., NaD | Pour Point, ° F. | Flash Point, ° F. |
|---|---|---|---|---|---|---|---|---|---|---|
| | | Cs. at −40° F. | Cs. at 100° F. | Cs. at 210° F. | | | | | | |
| | A. Conventional: | | | | | | | | | |
| I | Di-n-octyl azelate | (¹) | 11.32 | 3.25 | 175 | 0.674 | 0.9091 | 1.4472 | | |
| | Di-2-ethylhexyl sebacate | 1,400 | 12.80 | 3.34 | 154 | 0.706 | 0.9106 | 1.4492 | | |
| | Diisooctyl azelate | 1,285 | 12.54 | 33.8 | 164 | 0.686 | 0.9131 | 1.4488 | | |
| | B. Hindered: | | | | | | | | | |
| II | Di-2,2-dimethylhexyl | 4,722 | 15.90 | 3.65 | 133 | 0.725 | 0.9093 | 1.4471 | | |
| IV | Di-2,2-dimethylamyl-2,2-8,8-tetraethyl azelate | 3,140 | 13.26 | 3.23 | 126 | 0.736 | 0.9151 | 1.4555 | | |
| V | 2-butyl-2-ethyl-1,3-propanediol-di-2,2-dimethyl valerate | 10,610 | 13.41 | 2.87 | | | 0.820 | | −65 | 330 |
| VI | 2,2,5,5-tetramethyl-1,6-hexanediol-di-2,2-dimethyl valerate | 20,280 | 17.72 | 3.48 | | | 0.800 | | −70 | 345 |
| VII | Trimethylol propane ester of 2,2-dimethyl valerate | 30,000 | 26.70 | 4.21 | 40 | | 0.829 | | −60 | 325 |

¹ Solid.

TABLE I (Part 2).—RADIATION STABILITY PROPERTIES OF ESTERS

| Ex. No. | Diester | Radiation Dosage, Reps | Change in Acid No. | Percent of Ester Hydrolyzed by Radiation |
|---|---|---|---|---|
| | A. Conventional: | | | |
| I | Di-n-octyl azelate | 1.00×10⁶ | 0.21 | 0.08 |
| | | 1.13×10⁸ | 11.89 | 4.38 |
| | Di-2-ethylhexyl sebacate | 5.00×10⁶ | 0.31 | 0.04 |
| | | 4.3×10⁷ | 3.06 | 0.36 |
| | | 1.1×10⁸ | 6.91 | 2.63 |
| | Diisooctyl azelate | 2.78×10⁸ | 8.61 | 3.25 |
| | | 4.73×10⁸ | 13.03 | 5.00 |
| | B. Hindered: | | | |
| II | Di-2,2-dimethylhexyl azelate | 1.00×10⁶ | 0.42 | 0.16 |
| | | 1.25×10⁷ | 3.18 | 1.17 |
| | | 1.00×10⁸ | 5.77 | 2.17 |
| IV | Di-2,2-dimethylamyl-2,2-8,8-tetraethyl azelate | 1.00×10⁶ | 0.04 | 0.01 |
| | | 1.25×10⁷ | 0.24 | 0.10 |
| | | 1.03×10⁸ | 2.58 | 1.14 |
| V | 2-butyl-2-ethyl-1,3-propanediol-di-2,2-dimethyl valerate | 1.0×10⁸ | 2.43 | 0.80 |
| VI | 2,2,5,5-tetramethyl-1,6-hexanediol-di-2,2-dimethyl valerate | 1.0×10⁸ | 4.69 | 1.67 |
| VII | Trimethylol propane ester of 2,2-dimethyl valerate | 1.0×10⁸ | 4.51 | 1.26 |

From the data set forth in Table I, the superiority of the hindered esters of the invention in radiation stability relative to conventional diester fluids will be be readily apparent. The data further indicate that the greatest radiation stability is realized in those esters in which hindrance is provided in both the acyl and alcohol portions of the molecule (Examples IV through VII). Hindrance in the alcohol portion of the molecule alone does not appear to lend appreciable radiation stability to the system.

While particular embodiments of the invention have been described, it will be understood, of course, that the invention is not limited to such particular embodiments and details, since many modifications and innovations may be made in the practice of the invention without departure from the basic principles underlying the invention. It is therefore contemplated that the measure of the invention shall be found in the appended claims and reasonable equivalents thereof and that any such modifications and innovations as are within the terms of the claims or the equivalents of such terms shall fall within the true spirit and scope of the invention.

The invention having thus been described, what is claimed and desired to secure by Letters Patent is:

1. The method of lubricating machine elements subjected to atomic radiation comprising contacting said elements with a lubricating fluid having improved radiation stability and consisting essentially of a material having the formula

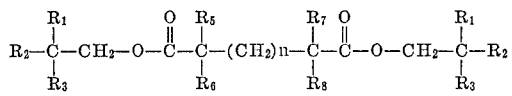

where $R_1$ and $R_3$ are alkyl groups containing not greater than 3 carbon atoms in each; $R_2$ is an acyclic alkyl group containing from 2 to 8 carbon atoms and may contain a single branch of not more than 2 carbon atoms; $R_5$, $R_6$, $R_7$, and $R_8$ are acyclic alkyl groups containing from 2 to 4 carbon atoms each; and $n$ is an integer varying from 2 to 6.

2. The method of lubricating machine elements subjected to atomic radiation comprising contacting said elements with a lubricating fluid possessing improved radiation stability and consisting essentially of di-(2,2,-dimethylpentyl)-2,2,8,8-tetraethyl azelate.

3. The method of lubricating machine elements subjected to atomic radiation comprising contacting said elements with a lubricating fluid having improved radiation stability and consisting essentially of a material having the formula

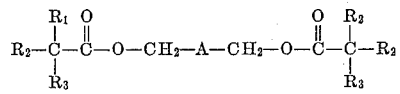

wherein $R_1$, $R_2$ and $R_3$ are acyclic alkyl groups containing from 1 to 20 carbon atoms and where A is selected from the group consisting of:

and

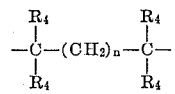

wherein $R_4$ is an acyclic alkyl group containing from 1 to 4 carbon atoms, and $n$ is an integer varying from 1 to 10.

4. The method of lubricating machine elements subjected to atomic radiation comprising contacting said elements with a lubricating fluid having improved radiation stability and consisting essentially of 2-butyl-2-ethyl-1,3-propanediol-di-2,2-dimethyl valerate.

5. The method of lubricating machine elements subjected to atomic radiation comprising contacting said elements with a lubricating fluid possessing improved radiation stability and consisting essentially of 2,2,5,5-tetramethyl hexanediol-di-2,2-dimethyl valerate.

6. The method of lubricating machine elements subjected to atomic radiation comprising contacting said elements with a lubricating fluid possessing improved radiation stability and consisting essentially of the trimethylol propane triester of 2,2-dimethyl valerate.

References Cited by the Examiner

UNITED STATES PATENTS

| | | | |
|---|---|---|---|
| 2,852,470 | 9/1958 | Henne et al. | 260—485 X |
| 2,889,354 | 6/1959 | Blake et al. | 260—485 X |
| 2,991,297 | 7/1961 | Cooley et al. | 252—56 X |
| 3,081,342 | 3/1963 | Ver Nooy | 260—485 |
| 3,115,519 | 12/1963 | Crouse et al. | 252—56 X |

DANIEL E. WYMAN, *Primary Examiner.*

P. P. GARVIN, W. H. CANNON, *Assistant Examiners.*